US012265967B2

(12) United States Patent
Segal et al.

(10) Patent No.: US 12,265,967 B2
(45) Date of Patent: *Apr. 1, 2025

(54) SYSTEMS AND METHODS FOR DETECTION OF FRAUD ATTACKS USING MERCHANTS TO TEST PAYMENT ACCOUNTS

(71) Applicant: MASTERCARD INTERNATIONAL INCORPORATED, Purchase, NY (US)

(72) Inventors: Mario Segal, Stamford, CT (US); Muthu Sundar Somasundaram, Elmsford, NY (US); Denis Tchaouchev, New York, NY (US); Ziying Li, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,819

(22) Filed: Aug. 25, 2023

(65) Prior Publication Data

US 2023/0401584 A1 Dec. 14, 2023

Related U.S. Application Data

(63) Continuation of application No. 16/994,188, filed on Aug. 14, 2020, now Pat. No. 11,775,974.

(51) Int. Cl.
*G06Q 20/40* (2012.01)
*G06Q 20/38* (2012.01)

(52) U.S. Cl.
CPC ..... *G06Q 20/4016* (2013.01); *G06Q 20/3825* (2013.01); *G06Q 20/409* (2013.01)

(58) Field of Classification Search
CPC .............................................. G06Q 20/00–425
See application file for complete search history.

(56) References Cited

U.S. PATENT DOCUMENTS

| 6,738,749 B1 * | 5/2004 | Chasko ................ G06Q 20/40 705/16 |
| 7,752,135 B2 | 7/2010 | Brown et al. |

(Continued)

FOREIGN PATENT DOCUMENTS

| WO | 2020023003 A1 | 1/2020 |
| WO | WO-2022005469 A1 * | 1/2022 |

*Primary Examiner* — Chenyuh Kuo
(74) *Attorney, Agent, or Firm* — Armstrong Teasdale LLP

(57) ABSTRACT

Provided herein is a computing system for detecting compromised merchants in a payment card network. The computing system includes a processor in communication with a memory, and the processor is configured to: (i) receive historical transaction data associated with historical transactions carried out at merchants, (ii) determine historical values for key merchant variables for each merchant, (iii) store the historical key merchant variable values, (iv) receive current transaction data associated with current transactions carried out at a selected merchant, (v) determine current values for key merchant variables for the selected merchant, (vi) compare the current key merchant variable values with the historical key merchant variable values for the selected merchant, (vii) identify abnormalities between the current key merchant variable values and the historical key merchant variable values for the selected merchant, and (viii) determine that the selected merchant is a compromised merchant based upon the identified abnormalities.

20 Claims, 5 Drawing Sheets

(56) References Cited

U.S. PATENT DOCUMENTS

| | | | | |
|---|---|---|---|---|
| 8,567,669 | B2* | 10/2013 | Griegel | G06Q 20/401 |
| | | | | 235/379 |
| 8,584,936 | B2 | 11/2013 | Fiebiger et al. | |
| 9,022,284 | B2 | 5/2015 | Graef et al. | |
| 9,294,268 | B2 | 3/2016 | von Mueller et al. | |
| 9,965,757 | B2 | 5/2018 | Bhinder | |
| 11,023,963 | B2* | 6/2021 | Zoldi | G06Q 40/12 |
| 11,348,110 | B2 | 5/2022 | Adjaoute | |
| 11,775,974 | B2* | 10/2023 | Segal | G06Q 20/409 |
| | | | | 705/75 |
| 11,875,350 | B2* | 1/2024 | Kala | G06N 5/01 |
| 2011/0078034 | A1* | 3/2011 | Hayhow | G06Q 30/0185 |
| | | | | 705/21 |
| 2014/0324699 | A1* | 10/2014 | Ding | G06Q 20/4016 |
| | | | | 705/44 |
| 2015/0033216 | A1* | 1/2015 | Appadurai | G06F 8/656 |
| | | | | 717/169 |
| 2016/0217470 | A1* | 7/2016 | Gerard | G06Q 20/1085 |
| 2017/0024723 | A1 | 1/2017 | Filler et al. | |
| 2017/0024828 | A1* | 1/2017 | Michel | G06Q 40/12 |
| 2019/0130404 | A1 | 5/2019 | Merz et al. | |
| 2019/0188722 | A1* | 6/2019 | Allbright | G06Q 20/4016 |
| 2019/0207953 | A1 | 7/2019 | Klawe et al. | |
| 2021/0192641 | A1* | 6/2021 | Das | G06F 16/2365 |

* cited by examiner

SYSTEMS AND METHODS FOR DETECTION OF FRAUD ATTACKS USING MERCHANTS TO TEST PAYMENT ACCOUNTS

CROSS REFERENCE TO RELATED APPLICATIONS

This application claims priority to and is a continuation of U.S. patent application Ser. No. 16/994,188 filed on Aug. 14, 2020, entitled "SYSTEMS AND METHODS FOR DETECTION OF FRAUD ATTACKS USING MERCHANTS TO TEST PAYMENT ACCOUNTS", which is hereby incorporated by reference in its entirety.

BACKGROUND

This disclosure relates generally to fraud detection in a computer network and, more particularly, to computer-based systems and methods for detecting fraud attacks on merchants that include test payments using compromised payment accounts prior to those payment accounts being used to carry out further fraudulent transactions.

Payment processing networks process numerous payment card transactions every day that are initiated by cardholders of payment cards. Most of these payment card transactions are valid transactions. However, at least some of these payment card transactions are fraudulent. In particular, one type of "fraud attack" carried out by fraudsters occurs when the fraudsters obtain lists of legitimate payment account identifiers (e.g., through hacking a system that stores the legitimate payment account identifiers). Before the fraudsters use the legitimate payment account identifiers for intended fraud, the fraudsters may sometimes test the payment account identifiers to ensure that the payment account identifiers may be used to carry out a transaction. In some instances, the fraudsters may hack into a back-end of the merchant systems to run the test transactions. In these instances, the merchants are usually unable to detect the hacking. Further, these test transactions are generally small amount transactions (e.g., less than $10.00 in many cases), so accountholders and issuers of the payment cards generally do not detect the test transactions either.

Once the fraudsters have successfully tested a payment card at a merchant, the fraudster is able to use the card for higher-priced fraud purchases or is able to sell the card on the "black market" for a high price to another fraudster who in turn uses it for higher-priced purchases.

Payment card transaction processors, such as payment networks and issuing banks, may monitor payment card transactions for signs of fraudulent activity. At least some known fraud detection systems may score certain payment card transactions based on certain characteristics of the payment card transactions in an effort to determine whether the payment card transactions are potentially fraudulent. Unfortunately, these known fraud detection systems are not able to detect certain types of widespread fraud attacks and are not able to detect fraudulent transactions until the transactions are over a certain dollar amount or these systems require multiple suspicious transactions. Moreover, these known systems lack processes and infrastructure to effectively detect test transactions and compromised merchant systems used to process the test transactions.

Accordingly, improved fraud detection methods and systems are needed to detect testing transactions at early stages so that further fraudulent purchases at much larger dollar amounts are avoided, and that an overall improvement in system processing is achieved by reducing the number of fraudulent payment messages being processed over the network.

BRIEF DESCRIPTION

In one embodiment, a computing system for detecting compromised merchants in a payment network is provided. The computing system includes at least one processor in communication with at least one memory, and the at least one processor is configured to: (i) receive historical transaction data associated with a plurality of historical transactions carried out at a plurality of merchants, (ii) determine, based upon the historical transaction data, historical values for key merchant variables for each merchant of the plurality of merchants, (iii) store the historical key merchant variable values in the at least one memory, (iv) receive current transaction data associated with a plurality of current transactions carried out at a selected merchant of the plurality of merchants, (v) determine, based upon the current transaction data, current values for key merchant variables for the selected merchant, (vi) compare the current key merchant variable values with the historical key merchant variable values for the selected merchant, (vii) identify abnormalities between the current key merchant variable values and the historical key merchant variable values for the selected merchant, and (viii) determine that the selected merchant is a compromised merchant based upon the identified abnormalities.

In another embodiment, a computer-implemented method for detecting compromised merchants in a payment network is provided. The method is implemented using a computing system including at least one processor in communication with at least one memory. The method includes: (i) receiving historical transaction data associated with a plurality of historical transactions carried out at a plurality of merchants, (ii) determining, based upon the historical transaction data, historical values for key merchant variables for each merchant of the plurality of merchants, (iii) storing the historical key merchant variable values in the at least one memory, (iv) receiving current transaction data associated with a plurality of current transactions carried out at a selected merchant of the plurality of merchants, (v) determining, based upon the current transaction data, current values for key merchant variables for the selected merchant, (vi) comparing the current key merchant variable values with the historical key merchant variable values for the selected merchant, (vii) identifying abnormalities between the current key merchant variable values and the historical key merchant variable values for the selected merchant, and (viii) determining that the selected merchant is a compromised merchant based upon the identified abnormalities.

In yet another embodiment, a non-transitory computer-readable storage medium including computer-executable instructions stored thereon is provided. When executed by a computing system including at least one processor in communication with at least one memory, the computer-executable instructions cause the at least one processor to: (i) receive historical transaction data associated with a plurality of historical transactions carried out at a plurality of merchants, (ii) determine, based upon the historical transaction data, historical values for key merchant variables for each merchant of the plurality of merchants, (iii) store the historical key merchant variable values in the at least one memory, (iv) receive current transaction data associated with a plurality of current transactions carried out at a selected merchant of the plurality of merchants, (v) determine, based upon the current transaction data, current values for key merchant variables for the selected merchant, (vi) compare the current key merchant variable values with the historical key merchant variable values for the selected merchant, (vii) identify abnormalities between the current key merchant variable values and the historical key merchant variable values for the selected merchant, and (viii) determine that the selected merchant is a compromised merchant based upon the identified abnormalities.

BRIEF DESCRIPTION OF THE DRAWINGS

FIG. 1 is a simplified block diagram of an example fraud analysis computing system for detecting compromised merchants and payment accounts in a payment card network, in accordance with one example embodiment of the present disclosure.

FIG. 2 is a simplified flow diagram illustrating a fraud detection process implemented using the fraud analysis computing system shown in FIG. 1.

FIG. 3 illustrates an example configuration of a server system that may be used in the fraud analysis computing system shown in FIG. 1.

FIG. 4 illustrates an example configuration of a client system that may be used in the fraud analysis computing system shown in FIG. 1.

FIG. 5 is a flow diagram of a computer-implemented method for detecting compromised merchants and payment accounts in a payment card network.

DETAILED DESCRIPTION

Figure 1:
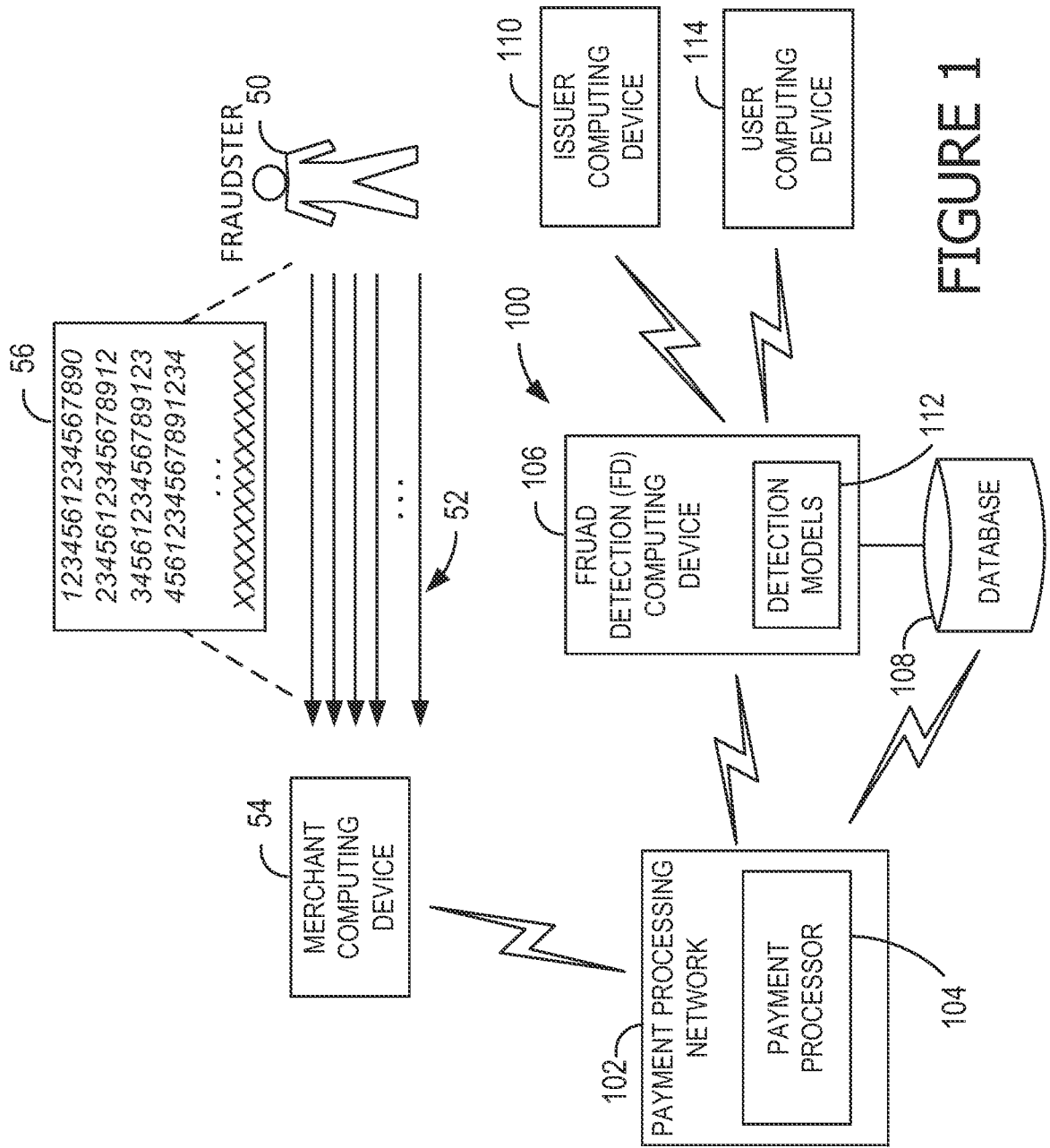
FIGS. 1-5 show example embodiments of the methods and systems described herein.

Embodiments of the present disclosure describe a fraud analysis computing system, and methods implemented using such a computing system. The fraud analysis computing system is configured to detect compromised merchants and payment accounts used in conducting testing transactions as part of a fraud attack. More specifically, the fraud analysis computing system, and more specifically, a fraud detection (FD) computing device of the fraud analysis computing system, is configured to identify test transactions, the merchants used in the initiation of the test transactions, and the payment account identifiers associated with the test transactions. In some embodiments of the disclosure described herein, the FD computing device is a part of a payment processing network that processes transactions initiated with a payment account (e.g., a credit card, a digital wallet token, a debit card, etc.). In other embodiments, the FD computing device is separate from, but in communication with, the payment processing network.

During some fraud attacks, fraudsters may obtain legitimate payment account identifiers (also referred to herein as primary account numbers or PANs) through illegitimate means (e.g., hacking systems that store or process the legitimate payment account identifiers). During these attacks, the fraudsters may want to test the PANs before they initiate the intended fraud transactions (e.g., larger payment transactions) to ensure that the intended fraud transactions will be authorized. These tests, referred to herein as "test transactions" or "testing transactions," are typically smaller dollar amount transactions (e.g., transactions that are less than $10.00) that are processed in large numbers (e.g., tens of thousands of transactions per day) through compromised merchants (e.g., merchants that have allowed, knowingly or unknowingly, testing transactions to be initiated with them).

In some fraud attacks, the fraudsters process the test transactions with the compromised merchants by hacking a computing system (e.g., a point of sale device or an online sales portal) of the merchant if, for example, the computing system has insufficient security systems in place. Occasionally, the fraudsters may make agreements or arrangements with certain merchants to process the test transactions for a percentage of the earnings made from fraudulent transactions.

Because the test transactions are typically for smaller dollar amounts (e.g., in some cases less than one dollar or other currency), accountholders associated with the compromised PANs may not realize that their PANs are actually compromised during the testing period. It is usually not until later when a larger transaction amount is processed or when several larger transactions have been processed, which are the actual intended fraud transactions, that the fraud is actually discovered. During the testing period, previously known systems used by payment processing networks and/or issuers are not able to flag the test transaction as being fraudulent for the same reasons (e.g., unable to detect them). As a result of processing these test transactions and subsequent fraud transactions, compromised merchants may experience slower processing times over the payment network and a lower bandwidth for processing all transactions, but the compromised merchants may not realize that the slower times and processing speeds are due to their systems being compromised.

As described herein, the FD computing device identifies compromised merchants when the merchants are initially compromised during the testing stage, and therefore greatly limits or reduces the number of fraudulent transactions that are processed over a payment processing network. Further, the FD computing device determines which transactions are test transactions that are processed by or through the compromised merchants, and which transactions are legitimate transactions. The FD computing device is able to identify these testing transactions and the merchants used to initiate them because it is specifically programmed to do so as described herein and because of the unique configuration of the overall system which centrally locates the FD computing device within the overall system that exposes it to the data needed to make such determinations. Accordingly, the FD computing device ensures that legitimate transactions are properly authorized and cleared by the payment processing network while the test transactions are flagged as being fraudulent, and the associated PANs of the test transactions are identified as being compromised.

In the exemplary embodiment, the FD computing device receives historical transaction data for a plurality of transactions initiated at each merchant of a plurality of merchants. From the historical transaction data, the FD computing device identifies and determines values of transaction metrics (also referred to herein as transaction metrics, key merchant variables, and key merchant variable values) for each merchant. The transaction metrics or key merchant variables identify metrics of typical transaction processing for the merchant for one or more predetermined time periods. For example, the transaction metrics may include (i) an average number of PANs (e.g., primary account numbers) used to initiate transactions processed by a merchant in a predetermined time period, (ii) an average number of merchant names included in the transaction data of each transaction processed by the merchant in the predetermined time period, (iii) an average number of cross border transactions (e.g., transactions initiated in one country or state with a merchant located in another country or state) processed by the merchant in the predetermined time period, and (iv) an average number of card-not-present transactions (e.g., transactions initiated online without the physical payment card being presented to the merchant) processed by the merchant in the predetermined time period. In some fraudulent attacks, the fraudsters may input gibberish for the merchant name in the transaction data (e.g., into a merchant identifier field of the transaction data), whereas legitimate merchants typically have the same merchant name or one or two slightly different merchant names (e.g., X Grocery Store or X Market) automatically input into the transaction data (e.g., through a point of sale system of the legitimate merchant). Accordingly, a large number of merchant names processed for one merchant may be indicative of fraud attacks.

The predetermined time period may be every day, every two days, every week, every month, every season, etc. Accordingly, since transaction metrics are determined for one or more predetermined time periods, the transaction metrics may identify broader transaction processing trends for the merchants. For example, the broader processing trends may include typical transaction metrics processed per month, per season, per specific day, etc. that give a more complete view of typical transaction processing for the merchants. That is, the transaction metrics may account for the fact that the merchants are seasonal merchants (e.g., summer ice cream vendors or winter ice skating rental vendors) or that the merchants have specific days where there are spikes in transactions (e.g., Black Friday or the day after Christmas). The FD computing device stores the transaction metrics for each merchant in a memory device (e.g., a database) associated with the FD computing device.

In the exemplary embodiment, the FD computing device analyzes current merchant transaction flows (e.g., current transaction data of transactions initiated at the merchants) to identify abnormalities in the merchant transaction flows. More specifically, the FD computing device uses artificial intelligence and/or machine learning techniques to generate one or more algorithms (also referred to herein as "detection models") that identify abnormalities in merchant transaction flows based upon the stored transaction metrics. The FD computing device may monitor the transaction flows of the merchants in real-time or near-real-time, or the FD computing device may receive the transaction flows from the merchants in a batch after a predetermined period of time (e.g., every 12 hours, every day, every two days, every week, etc.). The FD computing device uses the detection models to compare the current transaction data and the stored transaction metrics, and identify abnormalities between the current transaction flows and the stored transaction metrics. In some embodiments, the FD computing device utilizes the detection models to determine which transaction metrics are applicable to the current transaction flows, and the detection models use the applicable transaction metrics to determine the abnormalities. For example, if the merchant is a seasonable business (e.g., a summer ice cream stand), the FD computing device may determine which season the current transaction flows relate to before identifying any abnormalities in current transaction flows. For example, if the current transaction flows for the merchant take place in winter but have many more transactions than the winter transaction metrics, the FD computing device may identify the current transaction flows as having abnormalities. If the abnormalities are above a certain threshold, the FD computing device identifies the merchant with the transaction abnormalities as a compromised merchant. In some embodiments, the threshold is determined by a payment processing network and/or one or more issuers of the payment processing network associated with the FD computing device. In other embodiments, the threshold is predetermined by the FD computing device.

For example, the FD computing device may monitor transaction flows of a merchant that is a football stadium. The FD computing device may receive no current transaction data for months (e.g., when football is in its off-season) and then may receive current transaction data for one day indicating that the football stadium processed 20,000 unique PANS in one day (e.g., an opening game for the football stadium). In typical known fraud detection systems, this sudden spike in processed transactions would cause those transactions to be flagged as fraudulent. However, the FD computing device would identify this sudden spike in processed transactions as normal (e.g., based upon the transaction metrics showing that transactions spike in the months and on particular days when football is played). Accordingly, the football stadium merchant would not be identified as a compromised merchant using the systems and methods described herein, and the transactions carried out at the football stadium merchant would be processed normally and without interruption.

However, for example, the FD computing device may also monitor transaction flows of a merchant that is a small local pub in the middle of a state. The FD computing device may determine that transaction metrics for the pub are 50 PANs, 2 merchant names, 5 cross border transactions, and no card-not-present transactions processed per day. If the FD computing device receives current transaction data indicative of 20,000 PANs, 10,000 cross border transactions (e.g., transactions with account holder locations in other states or countries), 5,000 merchant names, and 15,900 card-not-present transactions processed in one day, the FD computing device would identify the pub as being a compromised merchant because of the large number of abnormalities between the current transaction data and the transaction metrics.

Once the FD computing device identifies the compromised merchant, the FD computing device may alert the merchant that the merchant is compromised. For example, the FD computing device may transmit an alert notification indicating that the merchant is compromised to the merchant computing system.

Further, the FD computing device may request and retrieve, itself, through the payment processing network, and/or through one or more issuers of the payment processing network, data associated with the merchant computing system. For example, the FD computing device may retrieve data associated with the security systems of the merchant computing system, how the merchant computing system is configured, and any other relevant data associated with merchant computing system. The FD computing device requests and retrieves the data from each compromised merchant, and compares and analyzes the data of the compromised merchants to determine similarities between the data. From the similarities between the compromised merchants, the FD computing device diagnoses problems with the compromised merchant computing systems. For example, the FD computing device may determine that most of the compromised merchant computing systems may have weak security features or a specific bug in their security software or configuration. Accordingly, the FD computing device can also recommend specific fixes or patches for the compromised merchant computing systems based upon the similarities. The notification to the compromised merchant indicating that the merchant is compromised may also include the recommended fix or patch. In other words, the FD computing device is configured to determine security patches or code fixes that may be needed to address or rectify the security breaches that exist at a compromised merchant that are the cause of the merchant being compromised, and the FD computing device is further configured to deploy those patches and/or fixes to the compromised merchant computing device so that the cause of the security breaches are addressed at the compromised merchant and such fraudulent transactions are no longer able to be initiated at that merchant.

Further, the FD computing device may deploy more computational resources to a particular geographic area if the FD computing device determines that a similarity between the compromised merchant computing devices is their geographic area. The FD computing device may alert the compromised merchant computing devices and/or associated payment processors that transactions processed in the geographic area should require additional authentication procedures to reduce the number of fraudulent transactions processed in the geographic area. Accordingly, the computational resources may include deploying or activating additional servers to the geographic area or providing any other additional computation resources to the merchant computing devices and payment processors to handle the additional authentication procedures. For example, if the compromised merchant computing devices of the geographic area begin requiring biometric data and/or two-factor authentication as the additional authentication measures for the processed transactions, the FD computing device ensures that the merchant computing devices and the payment processor servers can handle the additional authentication measures through providing the additional computational resources.

The FD computing device also determines the payment account identifiers associated with the current transactions initiated at each compromised merchant, as described further herein. Using the payment account identifiers, the FD computing device can determine whether the current transactions of the compromised merchant are test transactions or legitimate transactions based upon congruence between the payment account identifiers and the compromised merchant. For example, the FD computing device may generate a merchant signature and a payment account signature for each current transaction for the compromised merchant. The merchant signature may be a mathematical indication of locations of other transactions initiated by the payment account identifiers associated with each current transaction, and the payment account signature may be a mathematical indication of locations of other transactions initiated by the payment account identifiers associated with each current transactions. The FD computing device may compare the congruence of the merchant signature and the payment account signature for each current transaction, and determine a congruence score based upon the compared congruence of the merchant and payment account signatures. High congruence scores may be associated with legitimate transactions, whereas low congruence scores may be associated with test transactions. For example, if the compromised merchant is in a small town in the middle of a state and the payment account signature of a current transaction processed by the compromised merchant indicates that the accountholder of the payment account is located around the small town, the FD computing device calculates a high congruence score between the compromised merchant and the payment account and accordingly identifies the current transaction as a legitimate transaction. If, however, another current transaction has a payment account signature indicating that the accountholder of the payment account is located on a different continent, the FD computing device would calculate a very low congruence score between the compromised merchant and the payment account and accordingly identifies the other current transaction as a test transaction. Accordingly, the FD computing device ensures that the legitimate transactions are properly processed while the test transactions are flagged as fraudulent transactions.

Further, the FD computing device stores the determined congruence scores between the compromised merchants and the payment accounts (e.g., through the merchant and payment account signatures or any other means) in a memory device (e.g., the database associated with the FD computing device). Since the stored congruence scores are easily retrieved from the memory device by the FD computing device, the FD computing device may, in some embodiments, use the stored congruence scores as additional transaction metrics to determine if merchants are compromised. For example, the transaction metrics may show that a merchant usually processes transactions with high congruence scores to the merchant. If the FD computing device determines that there is a spike in a current transaction flow of transactions with very low congruence scores to the merchant, the FD computing device may determine that these low congruence scores are associated with test transactions and flag the merchant as compromised. The unique data structure of the congruence scores and the merchant and payment account signatures allows the FD computing device to quickly determine abnormalities in current transaction flows.

The FD computing device also stores the identified compromised merchants, and in some embodiments, the payment account identifiers associated with identified test transactions in a memory device (e.g., the database associated with the FD computing device). The FD computing device also generates a list of the identified compromised merchants and the payment account identifiers associated with the identified test transactions. The FD computing device can transmit the list to one or more issuers of the payment processing network such that the issuers can flag any transactions processed by the compromised merchants as requiring additional authentication before being processed, flag the payment account identifiers as fraudulent and take the proper steps to halt the use of the payment account identifier or require additional authentication when the payment account identifier is subsequently used, and/or require the compromised merchants to update and/or fix the merchant systems to reduce the possibility of the merchant being compromised again.

The technical problems addressed by this system include at least one of: (i) undetected network-based fraud events on a payment card transaction network, especially transactions used to test payment accounts before intended fraudulent transactions are initiated; (ii) increased network load from fraud attacks that include numerous repeated transaction attempts from a single merchant over a short period of time; (iii) increased network usage (slowing down the network) due to undetected fraudulent transactions (e.g., systematic attacks to test compromised payment account numbers); (iv) inability to detect and/or respond to early stages of fraud attacks; (v) inability to determine specific locations (e.g., specific compromised merchants) of fraud attacks and determine similarities between the computing systems of the compromised merchants; (vi) inability to detect a test transaction during the processing of the transaction; (vii) inability to determine and fix the causes of security breaches at compromised merchants; and/or (viii) inability to dynamically provide sufficient computational resources in the correct geographical locations to address increases in authentication services.

The methods and systems described herein may be implemented using computer programming or engineering techniques including computer software, firmware, hardware, or any combination or subset thereof, wherein the technical effects may be achieved by performing at least one of the following steps: (i) receiving historical transaction data associated with a plurality of historical transactions carried out at a plurality of merchants, (ii) determining, based upon the historical transaction data, historical values for key merchant variables for each merchant of the plurality of merchants, (iii) storing the historical key merchant variable values in the at least one memory, (iv) receiving current transaction data associated with a plurality of current transactions carried out at a selected merchant of the plurality of merchants, (v) determining, based upon the current transaction data, current values for key merchant variables for the selected merchant, (vi) comparing the current key merchant variable values with the historical key merchant variable values for the selected merchant, (vii) identifying abnormalities between the current key merchant variable values and the historical key merchant variable values for the selected merchant, and (viii) determining that the selected merchant is a compromised merchant based upon the identified abnormalities.

The resulting technical effect achieved by this system is at least one of: (i) reducing network-based fraud events through early detection; (ii) reducing future fraud events by flagging both compromised merchants and accounts/account numbers; (iii) applying artificial intelligence and/or machine learning algorithms to monitor a variety of transaction metrics to accurately and robustly detect fraud attacks; (iv) alerting affected parties to fraud attacks to facilitate increased fraud prevention; (v) determining similarities between compromised merchant computing systems to determine potential fixes to the merchant computing systems; (vi) detecting test transactions while the transaction are being processed; (vii) determining and fixing the causes of security breaches at compromised merchants; and/or (viii) dynamically providing sufficient computational resources in specific geographical locations to address increases in authentication services. Thus, the system enables enhanced fraud detection on the payment card transaction network. Once a pattern of fraudulent activity is detected and identified for specific merchants, further fraudulent payment card transaction attempts may be reduced or isolated from further processing on the payment card interchange network, which results in a reduced amount of fraudulent network traffic and reduced processing time devoted to fraudulent transactions, and thus a reduced burden on the network.

As used herein, the term "database" may refer to either a body of data, a relational database management system (RDBMS), or to both. As used herein, a database may include any collection of data including hierarchical databases, relational databases, flat file databases, object-relational databases, object oriented databases, distributed computing databases (e.g., Hadoop®), and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, a "processor" may include any programmable system including systems using central processing units, microprocessors, micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable payment card, such as a credit card, a debit card, a prepaid card, a charge card, a membership card, a promotional card, a frequent flyer card, an identification card, a prepaid card, a gift card, and/or any other payment device that may hold payment account information, such as mobile phones, Smartphones, personal digital assistants (PDAs), key fobs, and/or computers. Each type of payment device can be used as a method of payment for performing a transaction.

As used herein, the term "real-time" is used, in some contexts, to refer to a regular updating of data within a system such as payment processing networks and/or fraud detection systems. When a system is described as processing or performing a particular operation "in real-time," this may mean within seconds or minutes of an occurrence of some trigger event, such as new data being generated (e.g., an incoming transaction message being received), or on some regular schedule, such as every minute. In other contexts, some payment card transactions require "real-time" fraud operations, such as fraud scoring, which refers to operations performed during authorization of a payment card transaction (i.e., between the moment that a new payment card transaction is initiated from, for example, a merchant, and the time that an authorization decision is made, for example, back to that merchant). In such a context, "near real-time" fraud operations are operations conducted shortly after the payment card transaction has been initiated.

The following detailed description illustrates embodiments of the disclosure by way of example and not by way of limitation. It is contemplated that the disclosure has general application to fraud detection and prevention for payment card transactions.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic block diagram of a fraud analysis computing system 100 for detecting compromised merchants and payment accounts in a payment card network, such as payment card interchange network or payment processing network 102. For example, fraudsters 50 may use a compromised merchant 54 (represented in FIG. 1 as merchant computing device 54) to process numerous fraudulent transactions 52 using legitimate payment account identifiers 56 to test legitimate payment account identifiers 56 before carrying out further intended fraud, as described above in greater detail. Fraudulent transactions may strain the processing and network resources of payment processing network 102 and merchant 54. For example, these fraudulent attacks include a large number of attempted online transactions 52 in a short period of time, which may limit a bandwidth of payment processing network 102 that is available for legitimate transactions and interfere with the ability of merchant 54 to process legitimate transactions. Moreover, not detecting test transactions before further fraudulent transactions are initiated may result in additional activity over payment processing network 102 such as voids, rollbacks of cleared and settled transactions, and so forth, which may reduce processing speed and bandwidth available for legitimate transactions.

In the example embodiment, fraud analysis computing system 100 includes payment processing network 102, which itself includes a plurality of payment processors 104, as well as a fraud detection (FD) computing device 106 communicatively coupled to payment processing network 102 and to one or more databases 108. In some embodiments, as noted above, FD computing device 106 is implemented as part of, or in association with, payment processing network 102. Payment processing network 102 may include any transaction processing network, scheme, or system suitable for processing online transactions, including payment card (e.g., credit card, debit card, prepaid card, etc.) transactions, such as the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, New York).

In a typical payment card system, an issuer (represented in FIG. 1 as an issuer computing device 110) issues a payment card, such as a credit card, to a consumer or cardholder (not shown), who uses the payment card to tender payment for a purchase from merchants. During fraudulent transactions, a primary account number (PAN), also referred to herein as a "payment account identifier," associated with the payment card may be fraudulently provided (e.g., by a fraudster) to initiate the transactions without the knowledge and/or consent of the cardholder. When the payment account identifier is used to initiate a transaction with a merchant, the merchant requests authorization from their own merchant bank for the amount of the purchase. Using payment processing network 102, computers of the merchant bank will communicate with issuer computing device 110 by sending a payment card transaction authorization request. Based on the payment card transaction authorization request, issuer computing device 110 determines whether the account associated with the payment account identifier is in good standing and whether the purchase is covered by an available credit line. Issuer computing device 110 may additionally perform one or more authentication procedures to determine whether the transaction is genuine or legitimate (i.e., initiated by the cardholder). Based on these determinations, the request for authorization will be declined or accepted/authorized.

In the example embodiment, payment processing network 102 may route incoming or current payment card transaction authorization requests in real-time through FD computing device 106, as described above. Further, payment processing network 102 may store records of the authorization requests, also referred to herein as "historical transaction data," in database 108, and FD computing device 106 may retrieve and analyze the stored records to determine transaction metrics (also referred to as "key merchant variables" herein) for each merchant 54 of the payment processing network 102. The transaction metrics may include, for example, (i) an average number of payment account identifiers used to initiate transactions processed by a selected merchant 54 (e.g., over payment processing network 102) in the predetermined time period, (ii) an average number of merchant names included in the transaction data of each transaction processed by merchant 54 in the predetermined time period, (iii) an average number of cross border transactions determined by comparing a location of merchant 54 and a location associated with an accountholder of the payment account identifiers used to initiate transactions processed by merchant 54 in the predetermined time period, and (iv) an average number of card-not-present transactions processed by merchant 54 in the predetermined time period. The transaction metrics are predetermined metrics that indicate whether a merchant (e.g., merchant 54) has been compromised based upon abnormalities between historical transaction metrics and current transaction metrics associated with current transaction data. The predetermined time period may be, for example, a day, a week, a month, a season, etc. In some embodiments, the transaction metrics may also include an average congruence score between merchant 54 and payment accounts 56 for the transactions processed by merchant 54. Additionally or alternatively to receiving payment card transaction authorization requests in real-time, FD computing device 106 may retrieve and analyze the stored records to identify compromised merchants and test transactions at a later time.

FD computing device 106 is configured to monitor transaction flows (e.g., transaction data including transaction messages, like ISO8583 messages, processed over payment processing network 102, such as authorization request messages) using artificial intelligence and/or machine learning algorithms to detect and identify compromised merchants 54 and test transactions processed by compromised merchants 54. The artificial intelligence and/or machine learning algorithms may include one or more detection models 112 trained to identify abnormalities in merchant transaction flows, as described further herein. In particular, the transaction metrics for each merchant 54 based upon historical transaction data may be determined, stored (e.g., in database 108), and provided to detection models 112. These transaction metrics may be determined and pre-defined based upon analysis of a plurality of historical transactions (e.g., hundreds, thousands, etc., of historical transactions) initiated at each merchant 54.

As detection models 112 are applied to the real-time, near-real-time, or other predetermined time period (e.g., daily) transaction flows, these detection models 112 detect one or more abnormalities in the real-time transaction flows including, for example, (i) an increased number of payment account identifiers used to initiate transactions processed by a selected merchant (e.g., merchant 54) in the predetermined time period, (ii) an increased number of merchant names included in the transaction data of each transaction processed by merchant 54 in the predetermined time period, (iii) an increased number of cross border transactions processed by merchant 54 in the predetermined time period, and (iv) an increased number of card-not-present transactions processed by merchant 54 in the predetermined time period.

In some embodiments, when an attack is detected by detection models 112, FD computing device 106 identifies compromised merchant(s) 54 (or multiple merchants 54) being used to implement the attack (e.g., to process many test transactions). In some such embodiments, where the attack is ongoing or current, FD computing device 106 may alert merchants 54, payment processing network 102, and/or issuers 110 to require additional authentication measures (e.g., biometric data and/or two-factor authentication) be taken for all transactions processed by merchant 54. FD computing device 106 may also cause all suspected test transactions to be declined. FD computing device 106 may take other steps, such as notifying issuers, merchants, cardholders/accountholders, and/or law enforcement parties of the attack.

In addition, when an attack is detected, FD computing device 106 is configured to retrieve all transactions that may be associated with the attack. Specifically, FD computing device 106 identifies a time period associated with the attack and retrieves transactions initiated during that time period. FD computing device 106 then identifies, using detection models 112, whether each transaction is a test transaction or a legitimate transaction, and may append an attack identifier flag to all identified test transaction records during the time period associated with the attack.

Accordingly, FD computing device 106 extracts a payment account identifier from each transaction record associated with an identified test transaction. FD computing device 106 generates a notification that includes all of these compromised payment account identifiers and transmits the notification to one or more issuer computing devices 110 of the one or more issuers of the compromised payment account identifiers. In the example embodiment, the notification includes instructions that cause issuer computing device 110 to flag all of the payment account identifiers associated with test transactions in the notification as compromised. Accordingly, any time a compromised payment account identifier is used to initiate a future or subsequent transaction (e.g., the intended fraud transaction), that transaction will undergo enhanced authentication before being authorized and/or will be immediately declined by issuer computing device 110.

In some embodiments, the notification additionally or alternatively includes instructions that cause issuer computing device 110 to initiate a process for generating and providing new payment account identifiers to replace the compromised payment account identifiers. Because this process may not be immediate, the flagged payment account identifiers may be declined or used and subject to enhanced authentication before the new payment account identifier is issued.

When FD computing device 106 determines that an attack has taken place at merchants 54, FD computing device 106 may retrieve, either itself or through payment processing network 54, data associated with merchant computing devices 54. For example, FD computing device 106 may retrieve data associated with the security systems of merchant computing devices 54, how merchant computing devices 54 are configured, and any other relevant data associated with merchant computing devices 54. FD computing device 106 then analyzes similarities between compromised merchant computing devices 54 and the data associated with merchant computing devices 54. In some embodiments, FD computing device 106 may identify, based upon the similarities between compromised merchant computing devices 106, one or more fixes (e.g., software patches or increased security measures) for merchant computing devices 106, such that merchant computing devices 106 are not as likely to be compromised in the future or as vulnerable.

Accordingly, in some embodiments, the notification includes additional information, such as more details associated with the particular attack. For example, the notification may include the compromised merchant associated with the attack, details about the computing system of the merchant associated with the attack, similarities between compromised merchant computing devices 54, recommended fixes for merchant computing devices 54 based upon the similarities, and/or a time period associated with the attack. Issuer computing device 110, either itself or through, may choose to send an alert to merchants 54 notifying merchants 54 that their merchant systems are compromised. Further, the alert may include the recommended fixes for the merchant systems and ways to implement the fixes. In some embodiments, the alert may implement additional authentication procedures for any future transaction initiated at compromised merchants 54.

Further, in some embodiments, FD computing device 106 may deploy more computational resources to a particular geographic area if FD computing device 106 determines that a similarity between compromised merchant computing devices 54 is their geographic area. FD computing device 106 may alert compromised merchant computing devices 54 and/or associated payment processors 102 that transactions processed in the geographic area should require additional authentication procedures to reduce the number of fraudulent transactions processed in the geographic area. Accordingly, the computational resources may include deploying or activating additional servers to the geographic area or providing any other additional computation resources to the merchant computing devices and payment processors to handle the additional authentication procedures. Accordingly, FD computing device 106 ensures that the merchant computing devices 54, payment processor networks 102, and/or issuer computing devices 110 can handle the additional authentication measures through providing the additional computational resources.

Further, in some embodiments, FD computing device 106 transmits an alert to cardholders or accountholders associated with the compromised payment accounts. Specifically, FD computing device 106 may transmit the alert to a user computing device 114 associated with a respective cardholder/accountholder. In some such embodiments, the cardholders/accountholders may decide whether to prompt their issuer to issue a new payment account identifier or perform other actions (e.g., requesting that issuer 110 implement enhanced authentication procedures when the compromised payment account identifier is used to initiate a transaction). Accordingly, FD computing device 110 may receive user input from user computing device 114, the user input indicating a user selection of how the issuer is to proceed, and may transmit instructions to the respective issuer computing device 110 that cause the issuer to implement the user selection.

Figure 2:
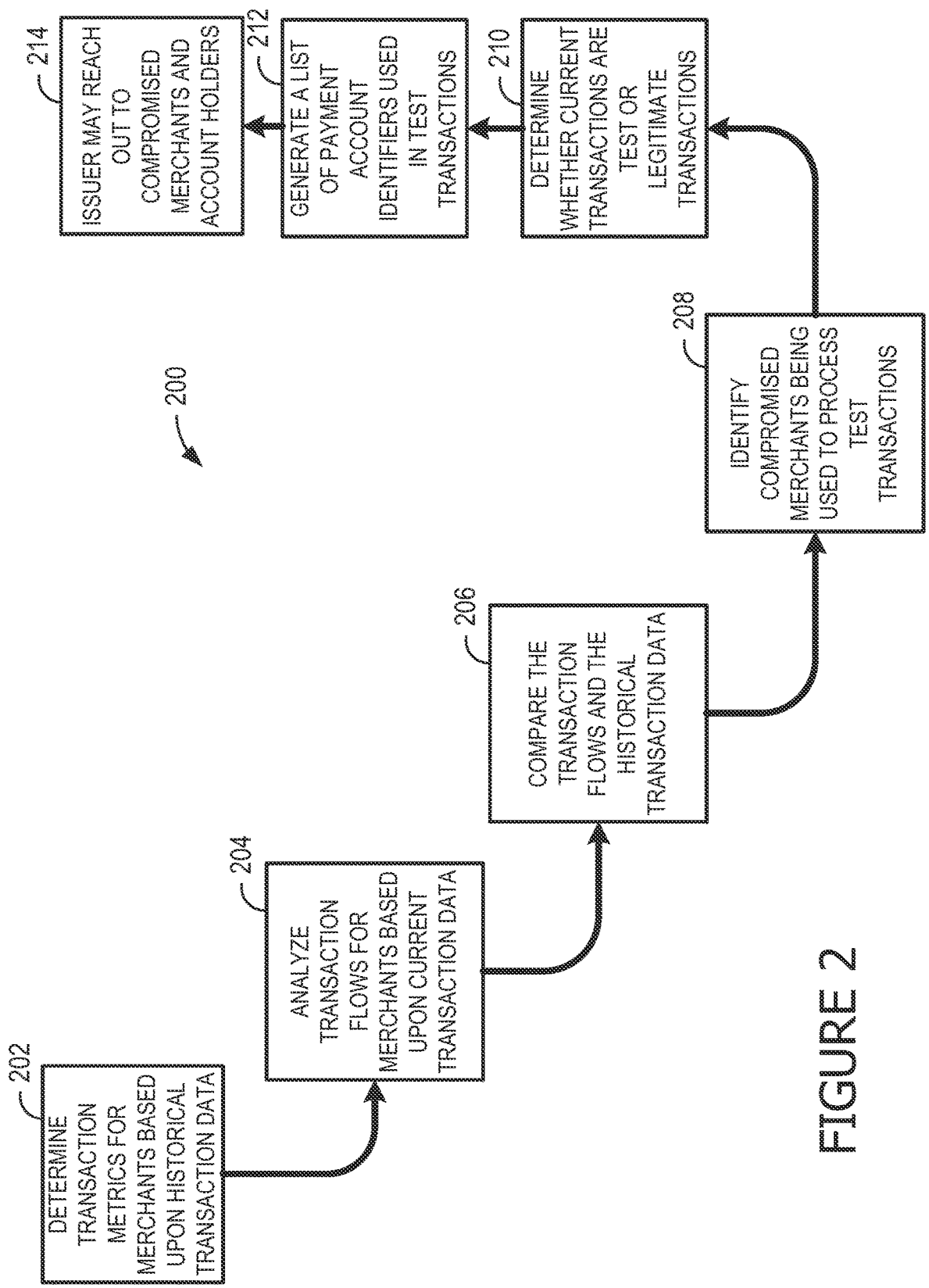

FIG. 2 is a simplified flow diagram illustrating a fraud detection process 200 implemented using fraud analysis computing system 100 shown in FIG. 1. As shown in step 202, FD computing device 106 (shown in FIG. 1) determines historical transaction metrics based upon historical transaction data (e.g., received from payment processor network 102, shown in FIG. 1). The transaction metrics include (i) an average number of PANs, (ii) an average number of merchant names, (iii) an average number of cross border transactions, and/or (iv) an average number of card-not-present transactions processed per predetermined time period. In some embodiments, the transaction metrics also include (v) an average congruence score between merchant 54 (shown in FIG. 1) and the payment accounts that initiate transactions with merchant 54.

FD computing device 106 is configured to analyze current transaction flows (e.g., based upon current transaction data received from payment processor network), as shown in step 204. In step 206, FD computing device compares the current transaction flows with the historical transaction metrics. FD computing device 106 then identifies compromised merchants based upon abnormalities between the historical transaction data and the current transaction flows in step 208 using detection models 112 (shown in FIG. 1). That is, FD computing device 106 identifies abnormalities between the historical transaction data and the current transaction flows using machine learning and/or artificial intelligence techniques.

For example, abnormalities may include (i) an increased number of PANs, (ii) an increased number of merchant names, (iii) an increased number of cross border transactions, and/or (iv) an increased number of card-not-present transactions processed per predetermined time period. An additional abnormality may include (v) a decreased congruence score between merchant 54 and the payment accounts that initiate transactions with merchant 54.

Further, once the compromised merchant is identified, in step 210, FD computing device 106 is configured to determine whether transactions of the current transaction flow of compromised merchant 54 are legitimate transactions or test transactions. In step 212, FD computing device 106 is configured to generate a list of payment account identifiers associated with the test transactions processed by compromised merchant 54.

FD computing device 106 is configured to transmit the generated list to one or more respective issuers of the payment account identifiers associated with the test transactions. As shown in step 214, the issuer may reach out to compromised merchants and accountholders associated with the payment account identifiers associated with the test transactions.

Figure 3:
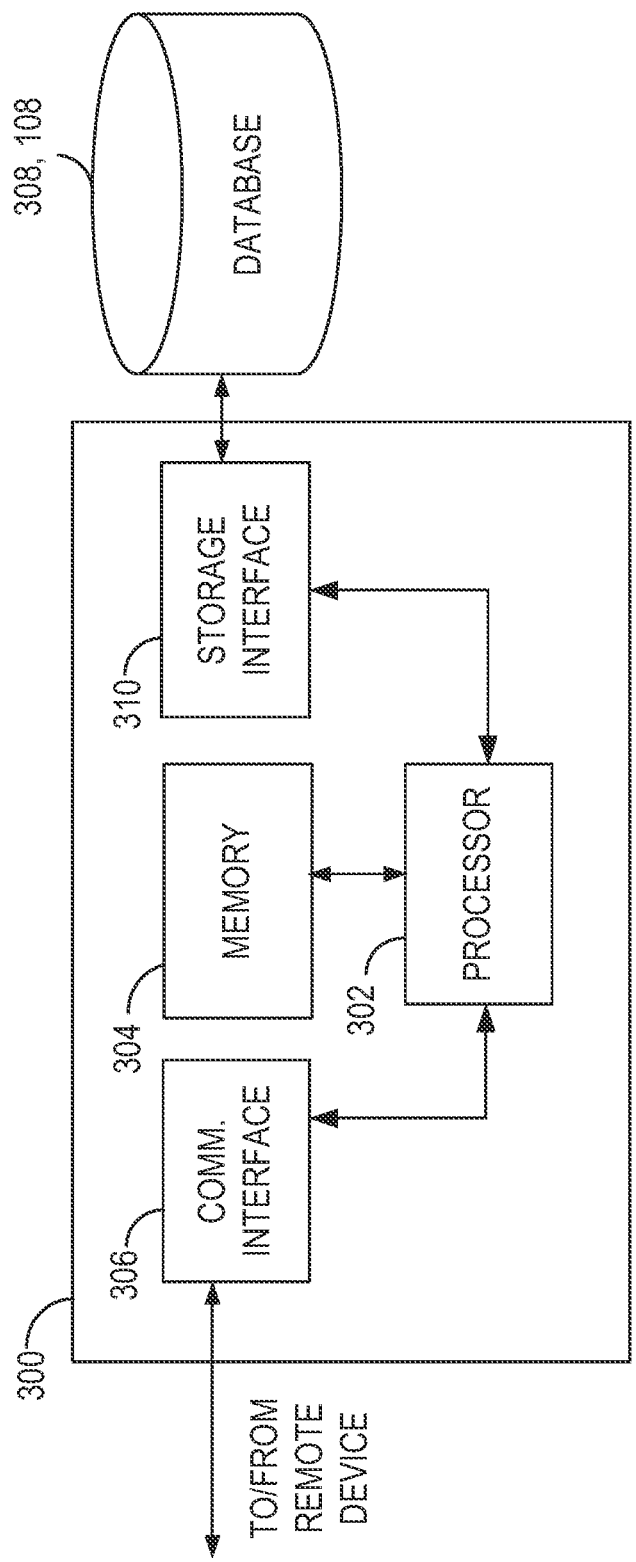

FIG. 3 illustrates an example configuration of a server system 300 that may be used with the fraud analysis computing system 100 shown in FIG. 1. Server system 300 may include, for example, payment processor, fraud detection (FD) computing device 106, and/or merchant computing device 54 (all also shown in FIG. 1).

Server system 300 includes a processor 302 for executing instructions. Instructions may be stored in a memory area 304, for example. Processor 302 may include one or more processing units (e.g., in a multi-core configuration) for executing instructions. The instructions may be executed within a variety of different operating systems on the server system 300, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 302 is operatively coupled to a communication interface 306 such that server system 300 is capable of communicating with remote devices such as client systems 400 (shown in FIG. 4) or another server system 300. For example, communication interface 400 may receive requests from a client system via the Internet.

Processor 302 may also be operatively coupled to a storage device 308, which may be used to implement database 108 (shown in FIG. 1). Storage device 308 is any computer-operated hardware suitable for storing and/or retrieving data. In some embodiments, storage device 308 is integrated in server system 300. For example, server system 300 may include one or more hard disk drives as storage device 308. In other embodiments, storage device 308 is external to server system 300 and may be accessed by a plurality of server systems 300. For example, storage device 308 may include multiple storage units such as hard disks or solid state disks in a redundant array of inexpensive disks (RAID) configuration. Storage device 308 may include a storage area network (SAN) and/or a network attached storage (NAS) system.

In some embodiments, processor 302 is operatively coupled to storage device 308 via a storage interface 310. Storage interface 310 is any component capable of providing processor 302 with access to storage device 308. Storage interface 310 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 302 with access to storage device 308.

Memory area 304 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
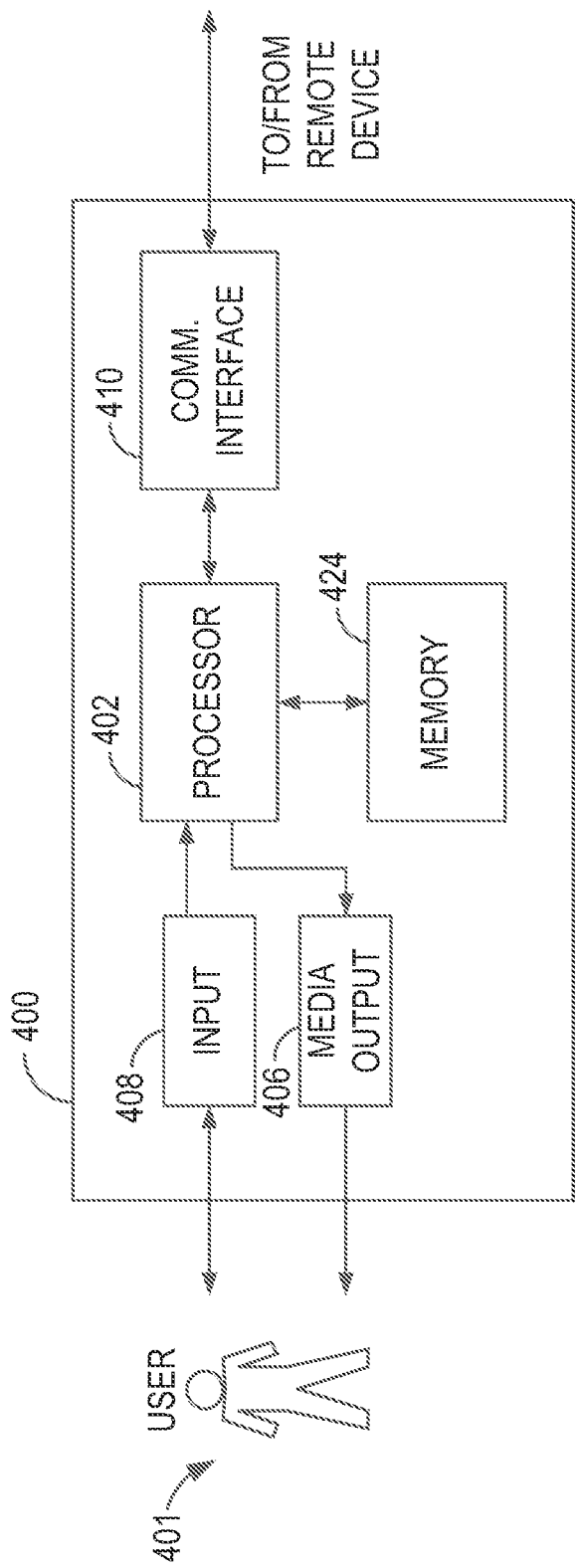

FIG. 4 illustrates an example configuration of a client system 400 that may be used in fraud analysis computing system 100 (shown in FIG. 1). Client system 400 may include, for example, merchant computing device 54, issuer computing device 110, and/or user computing device 114 (all also shown in FIG. 1). Client system 400 may be operated by a user 401. In the example embodiment, client system 400 includes a processor 402 for executing instructions. In some embodiments, executable instructions are stored in a memory area 404. Processor 402 may include one or more processing units, for example, a multi-core configuration. Memory area 404 is any device allowing information such as executable instructions and/or written works to be stored and retrieved. Memory area 404 may include one or more computer readable media.

Client system 400 also includes at least one media output component 406 for presenting information to user 401. Media output component 406 is any component capable of conveying information to user 401. For example, media output component is configured to display a graphical user interface to user 401. In some embodiments, media output component 406 includes an output adapter such as a video adapter and/or an audio adapter. An output adapter is operatively coupled to processor 402 and operatively coupleable to an output device such as a display device, a liquid crystal display (LCD), organic light emitting diode (OLED) display, or "electronic ink" display, or an audio output device, a speaker or headphones.

In some embodiments, client system 400 includes an input device 408 for receiving input from user 401. Input device 408 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 406 and input device 408. Client system 400 may also include a communication interface 410, which is communicatively coupleable to a remote device such as server system 300 (shown in FIG. 3). Communication interface 410 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Figure 5:
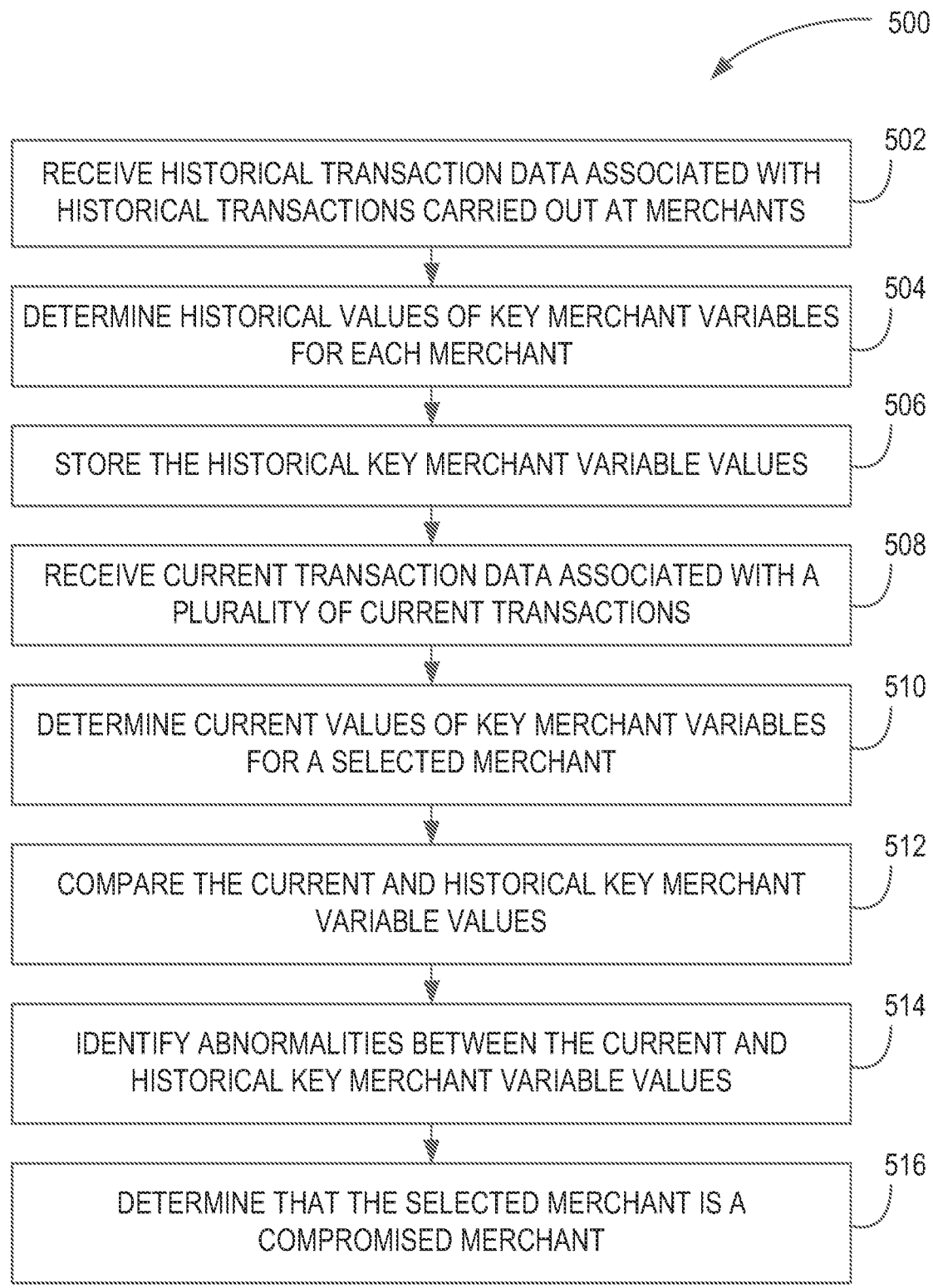

FIG. 5 is a flow diagram of a computer-implemented method 500 for detecting compromised merchants in a payment card network. Method 500 is implemented using at least one computing device, such as fraud analysis computing system 100, or, more specifically, fraud detection (FD) computing device 106 thereof (both shown in FIG. 1).

Method 500 includes receiving 502 historical transaction data associated with a plurality of historical transactions carried out at a plurality of merchants. Based upon the received 502 historical transaction data, historical values of key merchant variables are determined 504 for each merchant of the plurality of merchants, and the determined 504 historical key merchant variable values are stored 506 in at least one memory (e.g., database 108, shown in FIG. 1).

Method 500 further includes receiving 508 current transaction data associated with a plurality of current transactions carried out at a selected merchant. Based upon the received 508 current transaction data, current values of the key merchant variables are determined 510 for the selected merchant. The current and historical values are compared 512 for the selected merchant. Abnormalities between the compared 512 current and historical values are identified 514 for the selected merchant. Method 500 includes determining 516 that the selected merchant is a compromised merchant based upon the identified abnormalities.

Method 500 may include additional, alternative, and/or fewer steps. For example, in some embodiments, the key merchant variables are determined for one or more predetermined time periods, and the predetermined time periods are at least one of a day, a week, a month, and a season. The key merchant variables include at least one of: (i) an average number of payment account identifiers, (ii) an average number of merchant names, (iii) an average number of cross border transactions, and (iv) an average number of card-not-present transactions processed per predetermined time period. The abnormalities include at least one of (i) an increased number of payment account identifiers, (ii) an increased number of merchant names, (iii) an increased number of cross border transactions, and (iv) an increased number of card-not-present transactions processed per predetermined time period.

Method 500 may further include: (i) determining a combination of key merchant variables that are applicable for the current transaction data for each merchant of the plurality of merchants based upon the predetermined time period of the current transaction data, (ii) determining that at least one merchant is a compromised merchant based upon identified abnormalities between the comparison of the combination of key merchant variables and the current transaction data, (iii) transmitting a notification to the identified compromised merchant notifying the merchant that the merchant has been identified as being compromised, (iv) identifying each compromised merchant of the plurality of merchants, (v) analyzing data associated with the compromised merchants to identify similarities in the data between the compromised merchants, wherein the data includes data associated with security systems of computing devices associated with the compromised merchants and configurations of the computing devices, and (vi) transmitting a message to each compromised merchant, wherein the message includes a recommended fix for the merchants based upon the identified similarities between the compromised merchants.

Additionally or alternatively, method 500 further includes: (i) calculating a congruence score between the compromised merchant and a payment account identifier used to initiate each current transaction of the plurality of current transactions at the compromised merchant, (ii) determining whether each current transaction of the plurality of current transactions initiated at the compromised merchant is a test transaction or a legitimate transaction based upon the congruence score, (iii) generating a merchant signature for the compromised merchant, wherein the merchant signature indicates locations of other transactions initiated by the payment account identifiers associated with each current transaction, (iv) generating a payment account signature for each current transaction carried out at the compromised merchant, wherein the payment account signature indicates locations of other transactions initiated by the payment account identifiers associated with each current transactions, (v) calculating the congruence score based upon a congruence between the merchant signature and the payment account signature, (vi) determining the payment account identifiers associated with the test transactions, (vii) generating a list of the payment account identifiers associated with the test transactions, and (viii) transmitting the list to at least one issuer of the payment account identifiers As used herein, "machine learning" refers to statistical techniques to give computer systems the ability to "learn" (e.g., progressively improve performance on a specific task) with data, without being explicitly programmed for that specific task. "Artificial intelligence" refers to computer-executed techniques that allow a computer to interpret external data, "learn" from that data, and apply that knowledge to a particular end. Artificial intelligence may include, for example, neural networks used for predictive modelling.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "user computing device" refers to any computing device which is used in a portable manner including, without limitation, smart phones, personal digital assistants ("PDAs"), computer tablets, hybrid phone/computer tablets ("phablet"), or other similar device capable of functioning in the systems described herein. In some examples, user computing devices may include a variety of peripherals and accessories including, without limitation, microphones, speakers, keyboards, touchscreens, gyroscopes, accelerometers, and metrological devices.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computing system for detecting compromised merchants in a payment card network, the computing system comprising:
   at least one processor in communication with at least one memory; and
   the at least one memory storing instructions, that when executed by the at least one processor, cause the at least one processor to perform the steps of:
      storing historical key merchant variable values for each of a plurality of merchants in the at least one memory;
      receiving current transaction data associated with a plurality of current transactions from a merchant of the plurality of merchants, wherein the plurality of current transactions comprises test transactions of payment accounts;
      determining, based upon the current transaction data, current key merchant variable values for the merchant;
      identifying, in real-time, abnormalities between the current key merchant variable values and the historical key merchant variable values for the merchant;
      determining, based upon the identified abnormalities, that the merchant is a compromised merchant and the test transactions processed at the compromised merchant are fraudulent and associated with a security breach;
      identifying a compromised merchant computing system associated with the compromised merchant;
      identifying, based on the identified compromised merchant computing system, at least one of code fixes and security patches tailored to address the security breach associated with the fraudulent test transactions; and
      deploying the at least one of code fixes and security patches to the compromised merchant computing system to address the security breach associated with the fraudulent test transactions.

2. The computing system of claim 1, wherein the historical and current key merchant variable values are determined for one or more predetermined time periods, wherein the predetermined time periods are at least one of a day, a week, a month, and a season, wherein the key merchant variables are predetermined variables that indicate a compromised merchant when there are abnormalities between the current and historical values, and wherein the key merchant variables include at least one of: (i) an average number of payment account identifiers used to initiate transactions processed by the merchant in a predetermined time period of the one or more predetermined time periods, (ii) an average number of merchant names included in the transaction data of each transaction processed by the merchant in the predetermined time period, (iii) an average number of cross border transactions determined by comparing a location of the merchant and a location associated with an accountholder of the payment account identifiers used to initiate transactions processed by the merchant in the predetermined time period, and (iv) an average number of card-not-present transactions processed by the merchant in the predetermined time period.

3. The computing system of claim 2, wherein the abnormalities include at least one of (i) an increased number of payment account identifiers used to initiate transactions processed by the merchant in the predetermined time period, (ii) an increased number of merchant names included in the transaction data of each transaction processed by the merchant in the predetermined time period, (iii) an increased number of cross border transactions processed by the merchant in the predetermined time period, and (iv) an increased number of card-not-present transactions processed by the merchant in the predetermined time period.

4. The computing system of claim 2, wherein the instructions, that when executed by the at least one processor, further cause the at least one processor to perform the steps of:
determining a combination of historical key merchant variable values that are applicable for the current transaction data for the merchant based upon the predetermined time period of the current transaction data; and
determining, based upon the predetermined time period of the current transaction data, that the merchant is a compromised merchant by identifying abnormalities between the comparison of the historical key merchant variable values and the current key merchant variable values.

5. The computing system of claim 1, wherein the instructions, that when executed by the at least one processor, further cause the at least one processor to perform the steps of:
identifying compromised merchants of the plurality of merchants;
analyzing data associated with the compromised merchants to identify similarities in the data between the compromised merchants, wherein the data includes data associated with security systems of computing devices associated with the compromised merchants and configurations of the computing devices; and
determining at least one of the code fixes and the security patches for the merchants based upon the identified similarities between the compromised merchants.

6. The computing system of claim 1, wherein the instructions, that when executed by the at least one processor, further cause the at least one processor to perform the steps of:
calculating a congruence score between the compromised merchant and a payment account identifier used to initiate each current transaction of the plurality of current transactions at the compromised merchant; and
determining whether each current transaction of the plurality of current transactions initiated at the compromised merchant is a test transaction or a legitimate transaction based upon the congruence score.

7. The computing system of claim 6, wherein the instructions, that when executed by the at least one processor, further cause the at least one processor to perform the steps of:
generating a merchant signature for the compromised merchant, wherein the merchant signature indicates locations of other transactions initiated by the payment account identifier associated with each current transaction;
generating a payment account signature for each current transaction carried out at the compromised merchant, wherein the payment account signature indicates locations of other transactions initiated by the payment account identifier associated with each current transactions; and
calculating the congruence score based upon a congruence between the merchant signature and the payment account signature.

8. The computing system of claim 1, wherein the instructions, that when executed by the at least one processor, further cause the at least one processor to perform the steps of:
determining payment account identifiers associated with the test transactions;
generating a list of the payment account identifiers associated with the test transactions; and
transmitting the list to at least one issuer of the payment account identifiers.

9. A computer-implemented method for detecting compromised merchants in a payment card network, wherein the method is performed by a computing system including at least one processor in communication with at least one memory, the method comprising:
storing historical key merchant variable values for each of a plurality of merchants in the at least one memory;
receiving current transaction data associated with a plurality of current transactions from a merchant of the plurality of merchants, wherein the plurality of current transactions comprises test transactions of payment accounts;
determining, based upon the current transaction data, current key merchant variable values for the merchant;
identifying, in real-time, abnormalities between the current key merchant variable values and the historical key merchant variable values for the merchant;
determining, based upon the identified abnormalities, that the merchant is a compromised merchant and the test transactions processed at the compromised merchant are fraudulent and associated with a security breach;
identifying a compromised merchant computing system associated with the compromised merchant;
identifying, based on the identified compromised merchant computing system, at least one of code fixes and security patches tailored to address the security breach associated with the fraudulent test transactions; and
deploying the at least one of code fixes and security patches to the compromised merchant computing system to address the security breach associated with the fraudulent test transactions.

10. The computer-implemented method of claim 9, wherein the historical and current key merchant variable values are determined for one or more predetermined time periods, wherein the predetermined time periods are at least one of a day, a week, a month, and a season, wherein the key merchant variables are predetermined variables that indicate a compromised merchant when there are abnormalities between the current and historical values, and wherein the key merchant variables include at least one of: (i) an average number of payment account identifiers used to initiate transactions processed by the merchant in a predetermined time period of the one or more predetermined time periods,, (ii) an average number of merchant names included in the transaction data of each transaction processed by the merchant in the predetermined time period, (iii) an average number of cross border transactions determined by comparing a location of the merchant and a location associated with an accountholder of the payment account identifiers used to initiate transactions processed by the merchant in the predetermined time period, and (iv) an average number of card-not-present transactions processed by the merchant in the predetermined time period.

11. The computer-implemented method of claim 10, the method further comprising:
determining a combination of historical key merchant variable values that are applicable for the current transaction data for the merchant based upon the predetermined time period of the current transaction data; and
determining, based upon the predetermined time period of the current transaction data, that the merchant is a compromised merchant by identifying abnormalities between the comparison of the historical key merchant variable values and the current key merchant variable values.

12. The computer-implemented method of claim 9, the method further comprising:
identifying compromised merchants of the plurality of merchants;
analyzing data associated with the compromised merchants to identify similarities in the data between the compromised merchants, wherein the data includes data associated with security systems of computing devices associated with the compromised merchants and configurations of the computing devices; and
determining at least one of the code fixes and the security patches for the merchants based upon the identified similarities between the compromised merchants.

13. The computer-implemented method of claim 9, the method further comprising:
calculating a congruence score between the compromised merchant and a payment account identifier used to initiate each current transaction of the plurality of current transactions at the compromised merchant; and
determining whether each current transaction of the plurality of current transactions initiated at the compromised merchant is a test transaction or a legitimate transaction based upon the congruence score.

14. The computer-implemented method of claim 13, the method further comprising:
generating a merchant signature for the compromised merchant, wherein the merchant signature indicates locations of other transactions initiated by the payment account identifier associated with each current transaction;
generating a payment account signature for each current transaction carried out at the compromised merchant, wherein the payment account signature indicates locations of other transactions initiated by the payment account identifier associated with each current transaction; and
calculating the congruence score based upon a congruence between the merchant signature and the payment account signature.

15. The computer-implemented method of claim 9, the method further comprising:
determining payment account identifiers associated with the test transactions;
generating a list of the payment account identifiers associated with the test transactions; and
transmitting the list to at least one issuer of the payment account identifiers.

16. A non-transitory computer-readable storage medium including computer-executable instructions stored thereon, wherein when executed by a computing device including at least one processor in communication with at least one memory, the computer-executable instructions cause the at least one processor to perform the steps of:
storing historical key merchant variable values for each of a plurality of merchants in the at least one memory;
receiving current transaction data associated with a plurality of current transactions from a merchant of the plurality of merchants, wherein the plurality of current transactions comprises test transactions of payment accounts;
determining, based upon the current transaction data, current key merchant variable values for the merchant;
identifying, in real-time, abnormalities between the current key merchant variable values and the historical key merchant variable values for the merchant;
determining, based upon the identified abnormalities, that the merchant is a compromised merchant and the test transactions processed at the compromised merchant are fraudulent and associated with a security breach;
identifying a compromised merchant computing system associated with the compromised merchant;
identifying, based on the identified compromised merchant computing system, at least one of code fixes and security patches tailored to address the security breach associated with the fraudulent test transactions; and
deploying the at least one of code fixes and security patches to the compromised merchant computing system to address the security breach associated with the fraudulent test transactions.

17. The non-transitory computer-readable storage medium of claim 16, wherein the historical and current key merchant variable values are determined for one or more predetermined time periods, wherein the predetermined time periods are at least one of a day, a week, a month, and a season, wherein the key merchant variables are predetermined variables that indicate a compromised merchant when there are abnormalities between the current and historical values, and wherein the key merchant variables include at least one of: (i) an average number of payment account identifiers used to initiate transactions processed by the merchant in a predetermined time period of the one or more predetermined time periods, (ii) an average number of merchant names included in the transaction data of each transaction processed by the merchant in the predetermined time period, (iii) an average number of cross border transactions determined by comparing a location of the merchant and a location associated with an accountholder of the payment account identifiers used to initiate transactions processed by the merchant in the predetermined time period, and (iv) an average number of card-not-present transactions processed by the merchant in the predetermined time period.

18. The non-transitory computer-readable storage medium of claim 16, wherein the computer-executable instructions, that when executed by the at least one processor, further cause the at least one processor to perform the steps of:

determining a combination of historical key merchant variable values that are applicable for the current transaction data for the merchant based upon the predetermined time period of the current transaction data; and determining, based upon the predetermined time period of the current transaction data, that the merchant is a compromised merchant by identifying abnormalities between the comparison of the historical key merchant variable values and the current key merchant variable values.

19. The non-transitory computer-readable storage medium of claim 16, wherein the computer-executable instructions, that when executed by the at least one processor, further cause the at least one processor to perform the steps of identifying compromised merchants of the plurality of merchants;

analyzing data associated with the compromised merchants to identify similarities in the data between the compromised merchants, wherein the data includes data associated with security systems of computing devices associated with the compromised merchants and configurations of the computing devices; and determining at least one of the code fixes and the security patches for the merchants based upon the identified similarities between the compromised merchants.

20. The non-transitory computer-readable storage medium of claim 16, wherein the computer-executable instructions, that when executed by the at least one processor, further cause the at least one processor to perform the steps of:

calculating a congruence score between the compromised merchant and a payment account identifier used to initiate each current transaction of the plurality of current transactions at the compromised merchant; and determining whether each current transaction of the plurality of current transactions initiated at the compromised merchant is a test transaction or a legitimate transaction based upon the congruence score.

\* \* \* \* \*